United States Patent
Qu et al.

(10) Patent No.: US 7,684,787 B2
(45) Date of Patent: *Mar. 23, 2010

(54) METHOD AND APPARATUS FOR ROUTING MESSAGES OF DIFFERENT MESSAGE SERVICES IN A WIRELESS DEVICE

(75) Inventors: Hai Qu, San Diego, CA (US); Guangming Shi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1128 days.

This patent is subject to a terminal disclaimer.

(21) Appl. No.: 10/198,015

(22) Filed: Jul. 16, 2002

(65) Prior Publication Data

US 2004/0203614 A1 Oct. 14, 2004

Related U.S. Application Data

(60) Provisional application No. 60/384,307, filed on May 29, 2002.

(51) Int. Cl.
*H04L 12/58* (2006.01)
(52) U.S. Cl. ............... 455/412.1; 370/356; 379/114.02; 702/121; 709/220; 717/178
(58) Field of Classification Search ... 455/412.1–412.2, 455/414.2, 566.2, 55, 418, 566, 462, 552.1, 455/445, 412, 466; 340/825.5, 825.51, 2.1; 709/220, 238; 379/114.02; 705/14, 39; 713/201; 715/758; 726/24; 370/356; 702/121; 717/178

See application file for complete search history.

(56) References Cited

U.S. PATENT DOCUMENTS 5,548,712 A * 8/1996 Larson et al. .................. 714/7
5,757,680 A * 5/1998 Boston et al. ................ 702/121
6,006,099 A * 12/1999 Rondeau et al. ............. 455/462
6,128,509 A    10/2000 Veijola et al.
6,567,667 B1 * 5/2003 Gupta et al. ................. 455/445

(Continued)

FOREIGN PATENT DOCUMENTS

CN        1344472        4/2002

(Continued)

OTHER PUBLICATIONS

International Search Report-PCT/US03/016057, International Search Authority-European Patent Office, Sep. 11, 2003.

*Primary Examiner*—Gerald Gauthier
(74) *Attorney, Agent, or Firm*—Hossain S. Beladi; Darren M Simon

(57) ABSTRACT

A method, apparatus, and computer-readable media for routing a message service message in a wireless device is disclosed. According to a method, routing messages in a wireless device includes receiving routing preferences from one or more applications operating with a wireless device. The method further includes receiving a message, and routing the message to designated locations for the one or more applications. The locations may include an application or set of applications, or a memory unit associated with one or more applications. Another method includes determining a routing parameter from the message by parsing at least one routing parameter from message content. Routing the message further includes comparing the at least one routing parameter with the routing preferences.

18 Claims, 3 Drawing Sheets

U.S. PATENT DOCUMENTS

| | | | | |
|---|---|---|---|---|
| 6,882,641 | B1* | 4/2005 | Gallick et al. | 370/356 |
| 6,954,930 | B2* | 10/2005 | Drake et al. | 717/178 |
| 7,003,327 | B1* | 2/2006 | Payne et al. | 455/566 |
| 7,028,263 | B2* | 4/2006 | Maguire | 715/758 |
| 7,047,285 | B2* | 5/2006 | Burgess | 709/220 |
| 7,113,801 | B2* | 9/2006 | Back et al. | 455/466 |
| 7,142,883 | B2* | 11/2006 | Rouse et al. | 455/552.1 |
| 7,516,198 | B1* | 4/2009 | Appala et al. | 709/219 |
| 2001/0013069 | A1* | 8/2001 | Shah | 709/238 |
| 2002/0042886 | A1* | 4/2002 | Lahti et al. | 713/201 |
| 2002/0044635 | A1* | 4/2002 | Klug | 379/114.02 |
| 2003/0101244 | A1* | 5/2003 | Lockridge et al. | 709/220 |
| 2003/0167306 | A1* | 9/2003 | Kaplan | 709/205 |
| 2004/0006538 | A1* | 1/2004 | Steinberg et al. | 705/39 |
| 2004/0203657 | A1* | 10/2004 | Koskelainen | 455/414.1 |
| 2004/0209632 | A1* | 10/2004 | Link et al. | 455/466 |
| 2007/0118426 | A1* | 5/2007 | Barnes, Jr. | 705/14 |

FOREIGN PATENT DOCUMENTS

| | | |
|---|---|---|
| GB | 2 348 083 A | 9/2000 |
| WO | 0057657 | 9/2000 |

* cited by examiner

METHOD AND APPARATUS FOR ROUTING MESSAGES OF DIFFERENT MESSAGE SERVICES IN A WIRELESS DEVICE

CROSS REFERENCE

This application claims priority of U.S. Provisional Application Ser. No. 60/384,307, filed May 29, 2002 entitled "Method and Apparatus For Routing Messages of Different Message Services In a Wireless Device."

BACKGROUND

1. Field

The present invention relates to communication of data, and more particularly to routing data messages in a multi-mode wireless device.

2. Background

Various communication systems operating according to different communication protocols provide for communication of messages. Generally, communication of messages are provided through different message services. One of the message services is the short message service (SMS). The SMS is a wireless message service that provides a medium for communication of alphanumeric messages of limited size. The communication of SMS messages may be between mobile devices, or a mobile device and a wireless network. The SMS may be used for a variety of communication services such as electronic mail, paging, facsimile, voice mail, or Internet access. The SMS is available in communication systems operating in accordance with the Global System for Mobile Communications (GSM) standard, and code division multiple access (CDMA) standards, such as CDMA1X, CDMA2000, and WCDMA. The standards may include a specific set of protocols for communication of data. Such specific protocols include the General Packet Radio Service (GPRS) and the Universal Mobile Telecommunications Service (UMTS).

Another type of message services is known as Enhanced Messaging Service (EMS.) The EMS allows users of EMS-compliant mobile devices to send and receive text, melodies, pictures, and simple sounds and animations, or a combination thereof. The EMS is also supported by a number of communication standards. One more type of message services is multi-media messaging service (MMS). The MMS enables messages containing rich multimedia content to be exchanged over a wireless network. The MMS content can include any combination of images, animation, audio, video, data and text. The MMS is supported by a number of communication standards.

A mobile device having multiple communication modes may support the operations of communicating data in accordance with more than one standard. Therefore, the mobile device may be a multi-mode wireless device (MWD.) The MWD allows a user to send and receive voice and data over multiple wireless networks, each operating in accordance with a communication standard. The communication modes include, without limitation, operations in CDMA or GSM based systems, or GSM-based derivatives such as GPRS or UMTS. Other CDMA-based systems are also included, such as CDMA1X, CDMA2000, etc. The MWDs are generally compatible with the SMS, EMS, and MMS for each communication mode for sending and receiving messages.

A MWD may have several application programs for performing different applications. For example, an application may be animation of a character on a display. Another application may be for playing music via a speaker. Yet, another application may be displaying received text on the display, or converting the received text to an audible prompt via the speaker. The messages received via the message services may automatically be routed to each application operating on or with the MWD. Each application may typically perform the routing of the messages: i.e. when the application program is launched by the wireless device, the application receives every message and decides whether or not to use the received message. Not all applications are required to receive all messages. Therefore, a large amount of redundant processing is performed. Each application also has different uses for memory in a wireless device. An application uses memory for many functions such as storing application preferences and storing message data used by the application.

Some messages are intended only for certain applications, and not for others. These messages may include priority messages, privileged messages, or application-specific messages, for instance. In another instance, an application downloaded by the device, such as a third-party application, in particular may be limited to receive only certain messages, since the reliability and security of third party applications may not be verifiable. Therefore, a third-party application may need to be limited to receive certain messages. Furthermore, certain messages may not be intended for access by the user of the device. Such messages may include download messages for removable user identity module (R-UIM) and subscriber identity module (SIM) in the device.

Some message services which use a particular communication mode lack certain feature parameters. For example, GSM/UMTS SMS messages have no priority or privacy feature parameters. As a further example, CDMA SMS messages lack an indication of which messages may be intended for an external terminal.

There is therefore a need in the art for a method and apparatus for a centralized routing of messages in a wireless device.

SUMMARY

Embodiments disclosed herein address the above stated needs by providing a novel and improved method, apparatus, and computer-readable medium for centralized, dynamic routing of messages in a wireless device. A "message" can be any data structure compliant with SMS, EMS, MMS or any similar or derivative message structure which can be transmitted over a wireless network using a message service. In accordance with various aspects of the invention, a method for routing messages in a wireless device includes receiving routing preferences from one or more applications operating with the wireless device. The method further includes routing a message, received by the wireless device from a wireless network, to the one or more applications or to one or more memory units according to the routing preferences. A routing parameter from the message may be determined. The routing of the message includes comparing the routing parameter with the routing preferences. A computer-readable media may have code instructions for executing the routing of a message in a wireless device.

DETAILED DESCRIPTION

Figure 1:
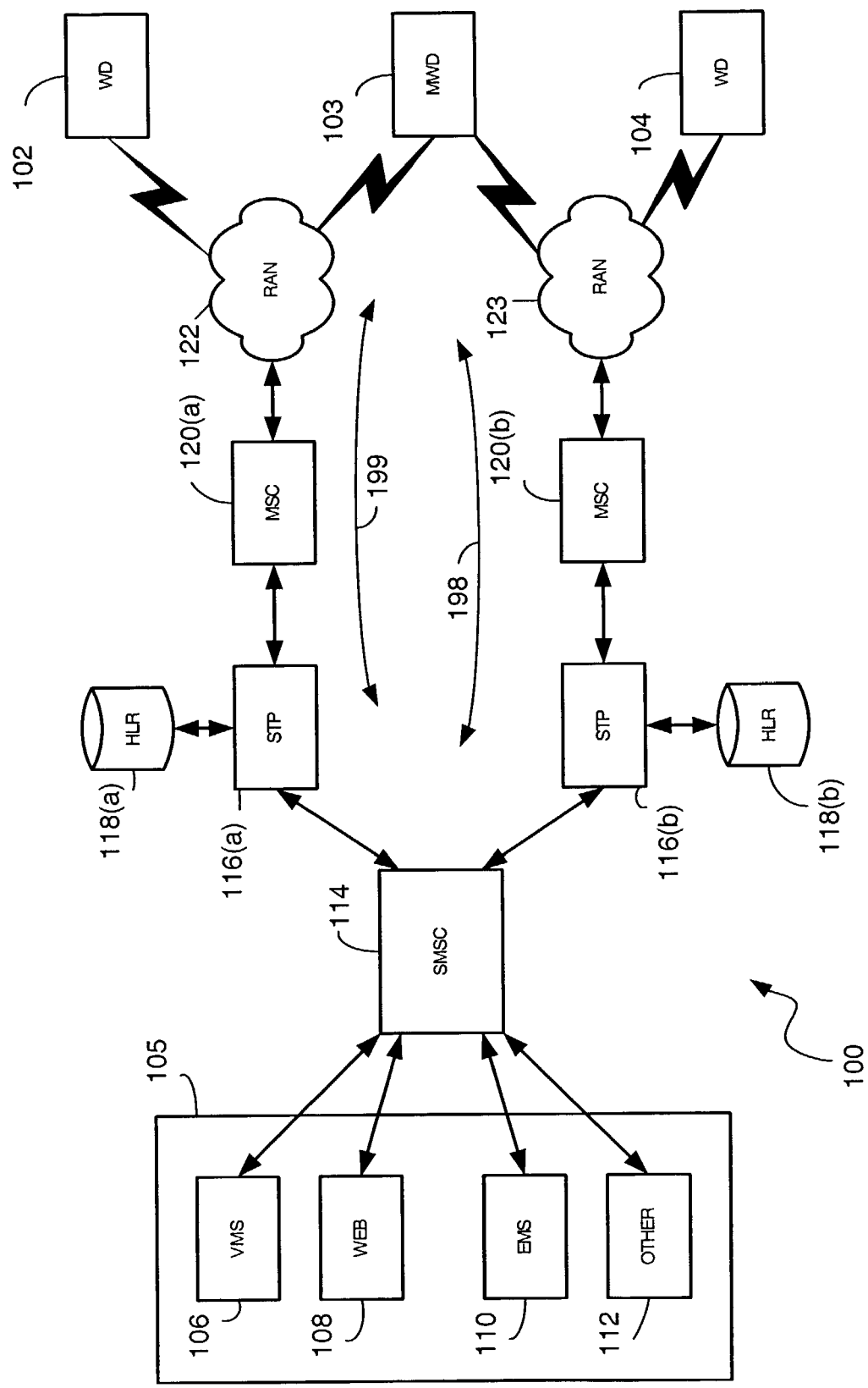
FIG. 1 illustrates a block diagram of a communication system having multiple wireless networks.

FIG. 1 is an illustration of a wireless communication system 100 capable of operating in accordance with various aspects of the invention. The communications at various block interfaces within the wireless communication system 100 may be compliant in accordance with the Interim Standard-41C, or variants thereof. The wireless communication system 100 may be integrated with other data communication systems. During operation, messages are communicated between wireless devices 102, 103, and 104 operated by respective users and one or more external short messaging entities (ESME) 105. Each wireless device may be any type of wireless communication device. Such devices may be connected or integrated with other types of devices, such as computers or devices operating like a computer. The wireless devices may also operate from a fixed location, such as a wireless local loop or a meter reading system, or a combination thereof. The wireless device 103 may be configured for operating with multiple wireless systems. Therefore, the wireless device 103 may be a MWD.

The ESME 105 may include voice mail systems 106, the Internet or a closed Intranet 108, electronic mail system 110, and other systems 112 such as fax machines, pagers, terminals or computers. The system 100 includes a short message service center (SMSC) 114, also known as a message center. Other message centers may be employed to handle different message services. The SMSC 114 may be a combination of hardware and software for relaying, storing and forwarding messages between the ESME 105 and the wireless devices.

The network paths 199 and 198 include one or more signal transfer points (STPs) 116(a) and 116(b), also known as gateways. The STPs 116(a) and 116(b) are connected with the SMSC 114 to enable IS-41C interconnections over signaling system 7 (SS7) links or similar channels with multiple network elements. Home location registers (HLR) 118(a) and 118(b) are connected with the STPs 116(a) and 116(b), respectively. Each HLR includes a database containing subscription data and service profiles of users. In response to a request from the SMSC 114, HLR 118(a) or 118(b) provides routing information for an indicated user. Further, if a recipient is not available when a message delivery is attempted, the HLR 118 signals the SMSC 114 when the recipient is accessible and when the message is deliverable. Each STP is connected with one or more mobile switching centers (MSC) 120(a) and 120(b). Each MSC performs switching functions and controls message routing to and from respective radio access networks (RANs) 122 and 123.

For purposes of simplicity, system 100 is shown with SMSC 114 in communication with two network paths 199 and 198. Each network path may include one signal transfer point (STP), one mobile switching center (MSC) and one radio access network (RAN). However, additional STPs, MSCs and RANs are also possible in each network path. Accordingly, the system 100 may include the ESME 105, SMSC 114, and a network path having at least one of each of an STP, MSC and RAN. The system 100 may include one or more SMSCs 114 or similar message centers.

In one example, the wireless device 102 is only compatible with the wireless network including the RAN 122 using a first wireless communication mode. Similarly, the wireless device 104 is only compatible with the wireless network including RAN 123 using a second wireless communication mode. Wireless device 102 could not communicate with the system 100 through the network path associated with RAN 123, nor could wireless device 104 communicate with the system 100 through the network path associated with the RAN 122. For example, RAN 122 may operate according to CDMA standard, and RAN 123 operate according to GSM standard. The MWD 103 may operate with both RANs 122 and 123.

For different communication modes such as CDMA and GSM modes, message services may require different formatting. For example, CDMA SMS messages are formatted differently than GSM SMS messages. The CDMA SMS messages include a number of parameters, such as priority, privacy, user response code, deferred delivery time, alert mode, display mode, language, callback number, teleservice ID, etc. GSM SMS messages include different parameters, such as: protocol ID, message class, compression information, and reject duplicate. Even where parameters are similar, their formats may be different. Further, each communication mode has its own distinct protocol stack, timing requirements and error codes as well. The MWD 103, however, is configured to communicate with wireless networks connected to either RAN 122 or 123, even where they operate according to different communication modes. Wireless devices 102, 103 and 104 can receive different types of messages depending on the services to which they are subscribed. In particular, by operating according to more than one communication mode, the MWD 103 can receive messages from various sources operating in accordance with different communication modes, such as CDMA and GSM modes.

A sender of a message, whether a wireless device or ESME 105, may append certain parameters to the message which can be used as a criteria for routing the message in the system 100. For example, GSM/UMTS SMS messages include certain class parameters that are appended to a message as it is processed down through the GSM/UMTS protocol stack before being transmitted. A centralized message routing module, according to an embodiment described herein, uses the appended parameters to route the message to an application or memory unit, based on routing preferences registered by the application. The preferences may be registered based on an origination mode message that includes the setting for a mobile device to designate a preferred wireless communication mode and associated message services. The setting may be used for creating, managing, processing and transmitting messages.

Figure 2:
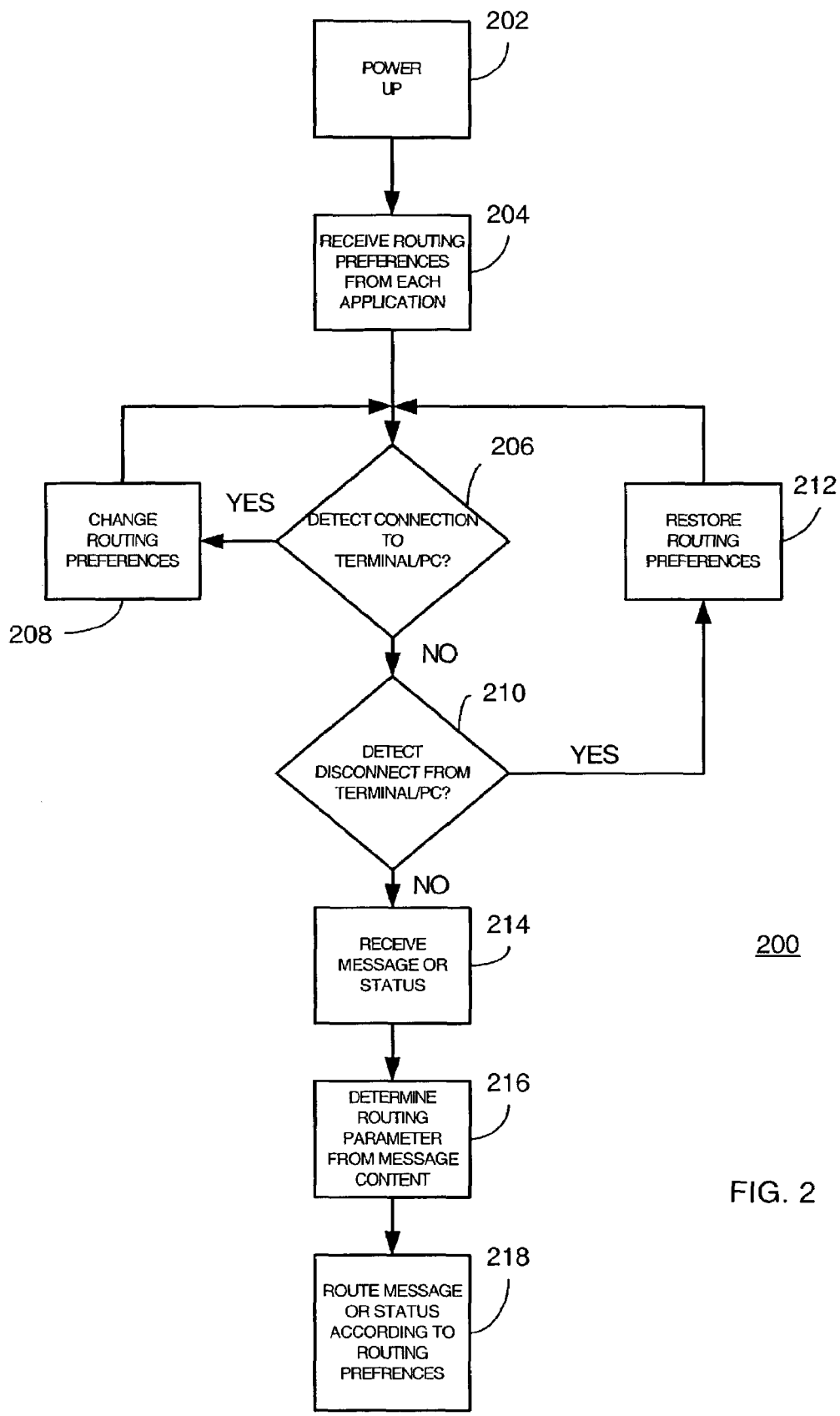
FIG. 2 illustrates a flow chart of a method for sending a message in accordance with various aspects of the invention.

FIG. 2 illustrating a flowchart 200 for routing messages in a MWD. The MWD may be MWD 103. Upon power-up at block 202, the MWD receives routing preferences from one or more applications operating with the MWD, as shown in block 204. The applications may be resident on the MWD, or operating externally with the MWD via external terminal, for example. The applications may change the registration of their routing preferences at any time after power-up. The routing preferences indicate to the MWD which messages each application wants to receive, or where content of the messages should be sent. In one example, an SMS application may designate that certain classes of SMS messages be routed directly to the application, while other classes be routed to a memory unit designated by the application in the routing preferences.

The MWD detects whether an external terminal or personal computer (PC), or other external device, has been connected to the MWD at block 206. The external terminal may register its own external routing preferences. The MWD automatically detects the external terminal, and changes the routing preferences accordingly at block 208 by incorporating the external routing preferences. For instance, the MWD may send certain types of messages to the external computing device. At block 210, the MWD detects when the external terminal has been disconnected. After disconnect, the MWD restores the routing preferences to the state they existed before the external computing device was connected, i.e. exclusive of the external preferences, as shown at block 212.

At block 214, the MWD receives a message. The message can be any type of message (SMS, EMS, MMS, etc.) formatted according to any communication mode type (GSM/UMTS, CDMA, etc.), or a status or acknowledgement message received in response to a previously sent message. The message status is routed according to the criteria mentioned herein, and/or by message transaction identifier (e.g. Message ID in CDMA, Message Reference Number in GSM). The MWD analyzes and parses the content of the message, including headers, addresses, payload, footers, etc., to determine one or more routing parameters from the message, at block 216. At block 218, the one or more routing parameters are correlated with the routing preferences by a comparison of the routing parameters with routing preferences, and the message is routed to the appropriate application(s) and/or external terminal(s). The message may also be stored by the MWD in one or more memory units associated with the application(s) including, without limitation, nonvolatile memory, multi-media card, flash memory, SIM or USIM (Universal Subscriber Identity Module), and random access memory (RAM).

Exemplary criteria for routing messages include routing a message with a specific CDMA SMS Teleservice ID or GSM/UMTS SMS Protocol ID to a specific application. Other criteria include a message with specific text, such as prefixes (i.e. "//application1", "//GPS" etc.) or keywords (i.e. "Stock Quotes", "Urgent" etc.). The text prefixes or keywords can also be used for introducing new services or applications (e.g. Telemarketing), and/or enhancing the existing services with new parameters (e.g. adding priority parameters to GSM SMS, for example). These new services and enhancements can be introduced before formal standards are defined for the services or parameters.

Figure 3:
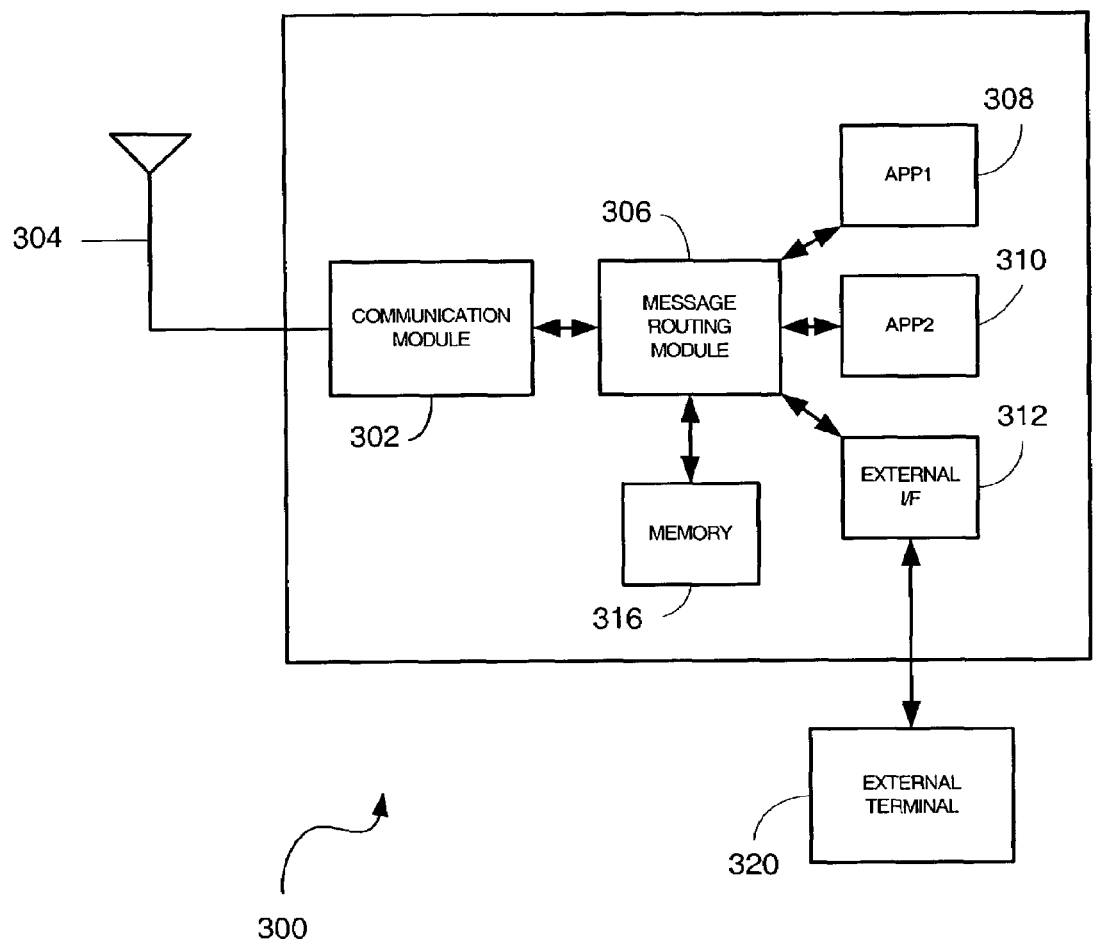
FIG. 3 illustrates a block diagram of an apparatus in an MWD in accordance with various aspects of the invention.

FIG. 3 is a simplified block diagram of a message routing apparatus 300 for routing messages in a MWD, such as MWD 103. The message routing apparatus 300 includes a communication module 302 that enables communication with a wireless network using a communication mode. The communication module sends and receives control and traffic signals via antenna 304. The apparatus 300 includes a message routing module 306 which receives and registers routing preferences from one or more applications 308, 310 and/or external terminal(s) 320. The message routing module 306 also receives and analyzes a message to determine routing parameters from the message. The message routing module 306 may be embodied as a control processor under direction of code instructions retrieved from a computer-readable medium, such as a memory unit 316.

The message routing apparatus 300 also includes the one or more application programs, designated generally as blocks 308 and 310. Although two applications are shown, more or fewer applications are possible. The message routing apparatus 300 may also include the external terminal 320, such as a computer, connected to an external interface unit 312. The message routing apparatus may include more than one external terminal 320. When the message routing apparatus 300 detects that the external terminal 320 is connected, the message routing module 306 receives external routing preferences from the external terminal 320, and changes the routing preferences to incorporate these external routing preferences. Messages may then be routed to the external terminal 320 from the message routing module 306 through the external interface unit 312. When the message routing apparatus 300 detects that the external terminal 320 is disconnected, the message routing module 306 restores the routing preferences to their original state, exclusive of the external routing preferences.

Application programs 308 and 310 generally represent application programs such as a global positioning satellite (GPS) application, or a message type-specific application such as a video player for MMS. The message routing apparatus 300 includes a memory unit 316. The memory unit 316 may be partitioned for one or more memory units or may include separate memory unit types for storing data associated with different applications. The memory unit 316 may store any type of data, including but not limited to, data used by the applications 308, 310, routing software used by the message routing module 306, preferences registered by the applications 308, 310, and parameters determined from incoming messages. The memory 316 may also be designated to receive messages according to the routing preferences.

Those of skill would further appreciate that the various illustrative logical blocks, modules, functional blocks, and algorithm steps described in connection with the embodiments disclosed herein may be implemented as electronic hardware, computer software stored on computer-readable media, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a wireless device. In the alternative, the processor and the storage medium may reside as discrete components in a user terminal connected with the wireless device.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for routing messages of different message services, comprising:
   receiving routing preferences from one or more applications operating with a wireless device, the one or more applications being resident on the wireless device and the routing preferences identifying application-specific preferences for routing messages received at the wireless device from a wireless network to an identified one of the one or more applications;
   receiving a message on said wireless device from the wireless network;
   analyzing and parsing the content of the message to determine at least one routing parameter from the message;
   comparing the at least one routing parameter to the received routing preferences to determine a match; and
   routing the message for the one or more applications resident on the wireless device according to the matched routing preference.

2. The method as set forth in claim 1, wherein the at least one routing parameter includes an origination address.

3. The method as set forth in claim 1, wherein the at least one routing parameter includes a message class.

4. The method as set forth in claim 1, wherein the at least one routing parameter includes a priority.

5. The method as set forth in claim 1, wherein the at least one routing parameter includes a range of parameter values.

6. The method of claim 1, wherein the routing parameter includes at least one of a CDMA SMS Teleservice ID for the message, a GSM/UMTS SMS Protocol ID for the message, a text prefix from the message, or a keyword from the message.

7. A method for routing messages of different message services, comprising:
   receiving routing preferences from one or more applications operating with a wireless device, the wireless device including a memory unit, the one or more applications being resident on the wireless device and the routing preferences identifying application-specific preferences for routing messages received at the wireless device from a wireless network to an identified one of the one or more applications:
   receiving a message on the wireless device from the wireless network;
   determining at least one routing parameter from the message;
   comparing the determined routing parameter to the received routing preferences to determine a match; and
   routing the message to the memory unit associated with at least one of the one or more applications, according to a comparison of the at least one routing parameter with the matched routing preference.

8. The method as set forth in claim 7, further comprising:
   detecting whether the wireless device is connected to an external terminal; and
   if the wireless device is connected to the external terminal, changing the routing preferences to incorporate external routing preferences of the external terminal.

9. The method as set forth in claim 8, further comprising, when the wireless device is disconnected from the external terminal, restoring the routing preferences to exclude the external routing preferences of the external terminal.

10. The method of claim 7, wherein the routing parameter includes at least one of a CDMA SMS Teleservice ID for the message, a GSM/UMTS SMS Protocol ID for the message, a text prefix from the message, or a keyword from the message.

11. An apparatus in a wireless device for routing messages from different message services, comprising:
    a communication module configured to receive a message from a wireless network;
    a message analyzing module, configured to analyze and parse the content of the message to determine at least one routing parameter from the message; and
    a message routing module, configured to receive routing preferences from one or more applications operating with said wireless device, the routing preferences identifying application-specific preferences for routing messages received at the wireless device from the wireless network to an identified one of the one or more applications, to compare the at least one routing parameter to the received routing preferences to determine a match and to route the message from the communication module for the one or more applications according to the matched routing preference, the one or more applications being resident on the wireless device.

12. The apparatus of claim 11, wherein the routing parameter includes at least one of a CDMA SMS Teleservice ID for the message, a GSM/UMTS SMS Protocol ID for the message, a text prefix from the message, or a keyword from the message.

13. The apparatus of claim 11, wherein the message routing module is further configured to detect whether the wireless device is connected to an external terminal, and if the wireless device is connected to the external terminal, to change the routing preferences to incorporate external routing preferences of the external terminal.

14. The apparatus of claim 13, wherein when the wireless device is disconnected from the external terminal, the message routing module is configured to restore the routing preferences to exclude the external routing preferences of the external terminal.

15. A computer-readable media for routing messages received in a wireless device from a wireless network, the computer-readable media storing code comprising:
    code for receiving routing preferences from one or more applications operating with a wireless device, the one or more applications being resident on the wireless device and the routing preferences identifying application-specific preferences received from the one or more applications for routing messages received at the wireless device from the wireless network to an identified one of the one or more applications;
    code for analyzing and parsing the content of the message to determine at least one routing parameter from the message:
    code for comparing the routing parameter to the received routing preferences to determine a match; and
    code for routing the message for the one or more applications resident on the wireless device according to the matched routing preference.

16. The computer-readable media of claim 15, wherein the routing parameter includes at least one of a CDMA SMS Teleservice ID for the message, a GSM/UMTS SMS Protocol ID for the message, a text prefix from the message, or a keyword from the message.

17. The computer-readable media of claim 15, further comprising:
- code for detecting whether the wireless device is connected to an external terminal; and
- code for changing the routing preferences to incorporate external routing preferences of the external terminal when the wireless device is connected to the external terminal.

18. The computer-readable media of claim 17, further comprising:
- code for restoring the routing preferences to exclude the external routing preferences of the external terminal when the wireless device is disconnected from the external terminal.

* * * * *